US009595900B2

(12) United States Patent
Lehmann

(10) Patent No.: US 9,595,900 B2
(45) Date of Patent: Mar. 14, 2017

(54) METHOD AND ASSEMBLY FOR THE TURNING GEAR OPERATION OF A TURBO SET

(75) Inventor: Christoph Lehmann, Neukirchen-Vluyn (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1206 days.

(21) Appl. No.: 13/376,898

(22) PCT Filed: Apr. 21, 2010

(86) PCT No.: PCT/EP2010/055242
§ 371 (c)(1),
(2), (4) Date: Apr. 12, 2012

(87) PCT Pub. No.: WO2010/142486
PCT Pub. Date: Dec. 16, 2010

(65) Prior Publication Data
US 2012/0187923 A1   Jul. 26, 2012

(30) Foreign Application Priority Data
Jun. 12, 2009   (EP) .................... 09007792

(51) Int. Cl.
| H02P 9/08 | (2006.01) |
| F01D 25/36 | (2006.01) |
| F02C 7/36 | (2006.01) |
| H02P 9/30 | (2006.01) |

(52) U.S. Cl.
CPC ............. *H02P 9/08* (2013.01); *F01D 25/36* (2013.01); *F02C 7/36* (2013.01); *H02P 9/302* (2013.01)

(58) Field of Classification Search
CPC ........ H02K 19/38; H02K 19/36; H02K 19/28; F02N 11/04; F02N 11/08; H02P 9/08; H02P 9/302; F01D 25/36; F02C 7/36
USPC ...................... 322/59, 52, 44, 89, 60; 290/52
See application file for complete search history.

(56) References Cited

U.S. PATENT DOCUMENTS

| 4,093,869 A | 6/1978 | Hoffmann et al. |
| 5,512,811 A | 4/1996 | Latos et al. |
| 6,838,779 B1 * | 1/2005 | Kandil et al. ................. 290/31 |
| 2004/0070373 A1 | 4/2004 | Nelson et al. |
| 2007/0222220 A1 | 9/2007 | Huang et al. |

FOREIGN PATENT DOCUMENTS

| CH | 657921 A5 | 9/1986 |
| DE | 1226828 B | 10/1966 |
| DE | 1956178 A1 | 5/1971 |
| DE | 2422011 A1 | 11/1975 |
| EP | 0690204 A2 | 1/1996 |
| EP | 1289118 A1 | 3/2003 |

* cited by examiner

*Primary Examiner* — Tulsidas C Patel
*Assistant Examiner* — Viet Nguyen

(57) ABSTRACT

An assembly including an electric generator and a steam turbine and an excitation device is provided. The excitation device is designed such that during nominal operation the auxiliary excitation machine is designed as permanently excited synchronous machine and the auxiliary excitation machine is designed as a synchronous motor or turning gear motor in a turning gear operation.

4 Claims, 1 Drawing Sheet

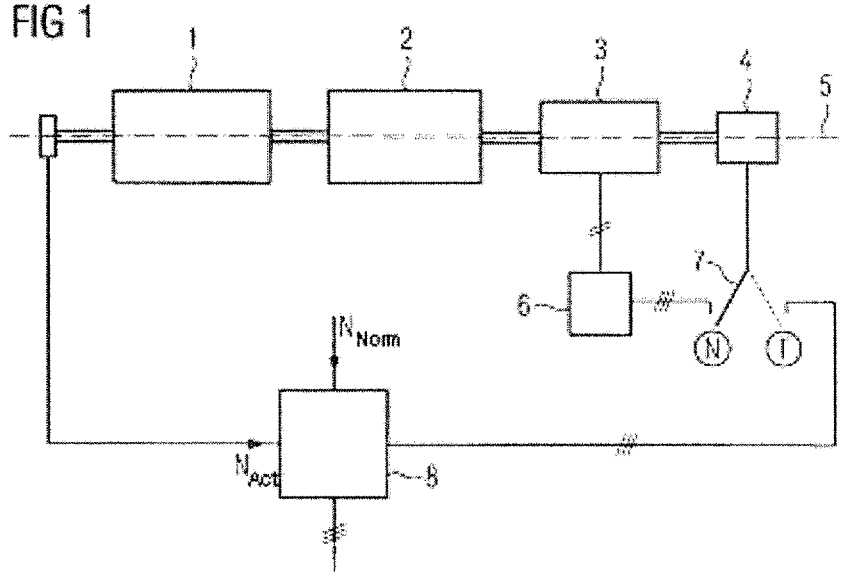
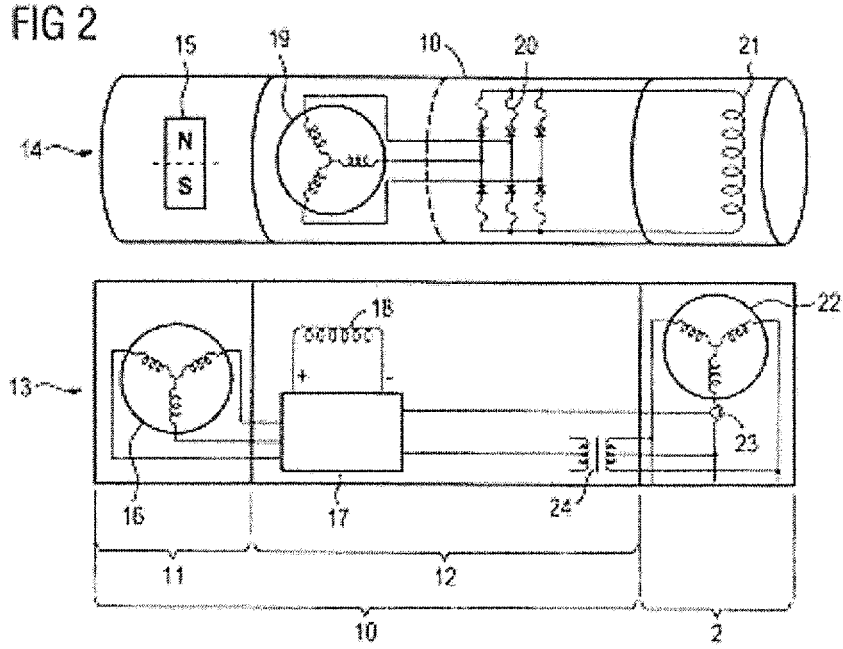

METHOD AND ASSEMBLY FOR THE TURNING GEAR OPERATION OF A TURBO SET

CROSS REFERENCE TO RELATED APPLICATIONS

This application is the U.S. National Stage of International Application No. PCT/EP2010/055242, filed Apr. 21, 2010 and claims the benefit thereof. The International Application claims the benefits of European Patent Office application No. 09007792. EP filed Jun. 12, 2009. All of the applications are incorporated by reference herein in their entirety.

FIELD OF INVENTION

The invention relates to an arrangement, comprising an electrical generator, a main exciter machine and an auxiliary exciter machine, and to a method for turning a shaft run which comprises a steam turbine and/or a gas turbine and/or a generator.

BACKGROUND OF INVENTION

A turbogenerator having a polyphase synchronous generator is normally used to produce electrical energy in a power station. The turbogenerator essentially comprises a gas turbine, a polyphase synchronous generator and an exciter current device, possibly as well as a steam turbine. The polyphase current which is produced by the generator is tapped off on the stator winding of the generator, while the rotor winding is excited with direct current to produce a magnetic field. It is known for the direct current to be provided via brushless rotating rectifier exciter machines, or via sliprings from a solid-state thyristor-controlled exciter device. A brushless rectifier exciter machine having external poles is coupled to the generator such that its rotor rotates with the generator shaft. In a situation such as this, the polyphase current which is first of all produced in the exciter machine can be rectified with the aid of rectifiers which rotate with the rotor shaft of the exciter machine. The direct current which is produced by a rectifier exciter machine such as this can be passed directly to the rotor of the generator, without sliprings.

In contrast to a turbogenerator having a steam turbine as a drive, a gas turbine cannot accelerate the turbogenerator on its own. In general, the turbogenerator is started up from so-called turning operation at a rotation speed of about 100 rpm to 200 rpm, for which purpose a hydraulic-oil drive is generally used. As is known, a gas turbine cannot be ignited until an adequate rotation speed of about 1000 rpm is reached and then being accelerated further up to the nominal rotation speed. A separate so-called starting motor can be used to reach this rotation speed limit, or the generator can be used as a frequency-control motor for acceleration.

The shaft runs in those power stations which comprise a steam and/or gas turbine as well as a generator, must be rotated at a low rotation speed after being decelerated from operation at rated rotation speeds, and this is also referred to as a turning, in order to prevent deformation of the shafts as they cool down.

In this case, the shaft run is moved by a hydraulic motor, which is operated by oil pressure and is designed for this purpose, at rotation speeds of about 2 rpm up to 70 rpm.

SUMMARY OF INVENTION

Use of oil for the hydraulic motor which is operated by oil pressure always results in a fire risk. The object of the invention is to specify an arrangement and a method by means of which a shaft run in a power station can be turned without having to use an external hydraulic motor, which is operated by oil pressure, in this case.

This object is achieved by an arrangement comprising an electrical generator, a main exciter machine and an auxiliary exciter machine, wherein the auxiliary exciter machine is designed to produce electrical voltage during normal operation and to be used as a turning motor during turning operation.

During normal operation, the auxiliary exciter machine is a permanent-magnet synchronous machine which is fitted as a component of the rotating exciter device at the end of the generator-side shaft run. During normal operation, the auxiliary exciter machine is in the form of a synchronous generator, which produces the voltage for the field winding of the main exciter machine.

The invention now proposes that the auxiliary exciter machine be in the form of a synchronous motor which drives the shaft run at the required turning rotation speeds of about 2 rpm to 70 rpm. There is therefore no need whatsoever for the hydraulic motor, which is operated by oil pressure, for the turning drive. Furthermore, the physical length of the machine casing can be made shorter overall.

The changeover of the auxiliary exciter machine, which first of all operates as a synchronous generator, to a synchronous motor which drives the shaft run is carried out by switching the terminals of the auxiliary exciter machine to an appropriate polyphase feeder. This polyphase feeder produces a variable-frequency, variable electrical voltage. The auxiliary exciter machine therefore becomes a synchronous motor whose rotation speed can be set by the polyphase feeder and which provides the required turning rotation speeds of about 3 rpm to 100 rpm.

For the purposes of the invention, it is advantageous for an appropriate rotation speed signal to be emitted to the turbine tachogenerator, in order to control the rotation speed.

Further advantageous developments are specified in the dependent claims.

In a first advantageous development of the electrical generator, the main exciter machine and the auxiliary exciter machine are therefore coupled to one another via a shaft which transmits torque. For the purposes of the invention, this therefore advantageously avoids the use of a gearbox or similar torque-transmitting elements.

In a further advantageous development, the main exciter machine has a stator winding which is supplied with electric current from the auxiliary exciter machine.

The object relating to the method is achieved by a method for turning a shaft run which comprises a steam turbine and/or a gas turbine and/or a generator, wherein the auxiliary exciter machine which is required for production of a magnetic field is operated as a turning motor.

According to the invention, in the method, the auxiliary exciter machine is supplied with electrical voltage via a polyphase feeder, with the polyphase feeder producing a variable-frequency, variable electrical voltage.

BRIEF DESCRIPTION OF THE DRAWINGS

One exemplary embodiment of the invention will be explained in more detail with reference to the following drawings, in which:

FIG. 1 shows an overview of an arrangement;

FIG. 2 shows an outline circuit diagram of a turbogenerator with a rotating brushless exciter machine

DETAILED DESCRIPTION OF INVENTION

FIG. 1 shows a steam turbine 1, an electrical generator 2, a main exciter machine 3 and an auxiliary exciter machine 4. The steam turbine 1 comprises a rotor, which is not illustrated in any more detail, comprising a plurality of rotor blades, as well as a casing which has a plurality of stator blades. The rotor is borne such that it can rotate about a rotation axis 5. A gas turbine can be arranged to transmit torque in alternative embodiments, in addition to the steam turbine 1. The electrical generator 2 is arranged on the steam turbine 1, such that torque is transmitted. The electrical generator 2 has a rotor, which has a rotor winding 19, as well as a stator, which has a stator winding 22. The rotor winding 19 is supplied with an electrical voltage from the main exciter machine 3, leading to a magnetic field, which leads to an induced voltage in the stator winding 22 because of the rotatable movement about the rotation axis 5. The auxiliary exciter machine 4 and the main exciter machine 3 are likewise coupled to one another such that torque is transmitted.

A rectifier and a voltage regulator 6 are arranged between the auxiliary exciter machine 4 and the main exciter machine 3, rectified with electrical voltage transmitted by the auxiliary exciter machine 4, and adapting the level of the electrical voltage. During normal operation, that is to say when the shaft run is rotated at a frequency of 3000 rpm or 3600 rpm, a changeover switch 7, for normal operation is in the position N. As soon as the shaft run has to be decelerated from the comparatively high rotation speeds to low rotation speeds, the changeover switch 7 is moved to the position T for turning operation, thus allowing a connection to a polyphase feeder 8 with a controller. The polyphase feeder 8 produces an electrical voltage, with the level of the electrical voltage and the frequency of the electrical voltage being variable and adjustable. The auxiliary exciter machine 4 therefore becomes a synchronous motor, which drives the shaft run at the required turning rotation speed, which is between 3 rpm and 100 rpm. The actual rotation frequency $N_{act}$ and the nominal rotation frequency $N_{nom}$ are provided as input variables for the polyphase feeder 8, in order to control the auxiliary exciter machine, which is in the form of a turning motor. Finally, the polyphase feeder 8 is supplied with electrical power via the electrical power supply system.

FIG. 2 shows an outline circuit of the turbogenerator with a rotating brushless exciter machine 10. The outline circuit diagram shows the electrical generator 2 with a brushless rotating rectifier exciter machine 10, which comprises an auxiliary exciter machine 11 and a main exciter machine 12.

Both the generator 2 and the rectifier exciter machine 10 have stationary components 13 and rotating components 14. A current is induced in an auxiliary exciter winding 16 in the auxiliary exciter machine 11 by a rotating permanent magnet 15 and is supplied to a voltage regulator 17, to which a stator winding 18 of the main exciter machine 12 is connected. Instead of supplying voltage from auxiliary exciter winding 16 to the voltage regulator 17, a voltage supply can alternatively be provided from a power supply system, which is not illustrated, to the voltage regulator 17. The stator winding 18 produces a field which induces a current in a rotor winding 19 in the main exciter machine 12, which current is rectified by a rotating rectifier 20. This rectified current is supplied to a rotor winding 21 in the electrical generator 2, which is fitted as a rotating field winding on the rotor 9, which is not illustrated here. A polyphase current is therefore produced in a stator winding 22 of the generator 2, and can be fed into a power supply system, which is not illustrated. The voltage regulator 17 is connected to the stator winding 22 via a current transformer 23 and a voltage transformer 24. The outline circuit diagram shown in FIG. 2 shows normal operation, in which the auxiliary exciter machine is in the form of a permanent-magnet synchronous machine. According to the invention, the auxiliary exciter machine 11 is operated via the polyphase feeder and the changeover switch 7 as a synchronous motor, which moves the shaft run at the required turning rotation speeds.

The invention claimed is:

1. An arrangement, comprising:
    an electrical generator;
    a main exciter machine;
    an auxiliary exciter machine;
    a polyphase feeder; and
    a changeover switch,
    wherein the auxiliary exciter machine is designed to produce electrical voltage during normal operation and to be used as a turning motor during turning operation,
    wherein a polyphase feeder supplies a variable-frequency electrical voltage to the auxiliary exciter machine, and
    wherein the changeover switch designed for switching between normal operation and turning operation,
    wherein the main exciter machine includes a stator winding which is supplied with electric current from the auxiliary exciter machine, and
    wherein an electrical voltage is induced via the stator winding in a rotor winding of the main exciter machine.

2. The arrangement as claimed in claim 1, wherein the electrical generator, the main exciter machine and the auxiliary exciter machine are coupled to one another via a shaft which transmits torque.

3. The arrangement as claimed in claim 1, wherein the auxiliary exciter machine includes a permanent magnet which rotates about a rotation axis.

4. The arrangement as claimed in claim 1, wherein the polyphase feeder comprises a controller, and
    wherein the actual rotation frequency of the arrangement and the nominal rotation frequency are detected as an input variable in the controller.

* * * * *